(12) United States Patent
Gogolla et al.

(10) Patent No.: US 8,467,036 B2
(45) Date of Patent: Jun. 18, 2013

(54) LASER INSTRUMENT FOR ELECTRO-OPTICAL DISTANCE MEASUREMENT

(75) Inventors: Torsten Gogolla, Schaan (LI); Andreas Winter, Feldkirch (AT); Helmut Seifert, Serba (DE); Gero Schusser, Jena (DE)

(73) Assignee: Hilti Aktiengesellschaft, Schaan (LI)

( * ) Notice: Subject to any disclaimer, the term of this patent is extended or adjusted under 35 U.S.C. 154(b) by 240 days.

(21) Appl. No.: 12/790,705

(22) Filed: May 28, 2010

(65) Prior Publication Data
US 2010/0302527 A1  Dec. 2, 2010

(30) Foreign Application Priority Data
May 29, 2009  (DE) .......................... 10 2009 026 611

(51) Int. Cl.
*G01C 3/08*  (2006.01)
(52) U.S. Cl.
USPC ........... 356/4.01; 356/3.01; 356/3.1; 356/4.1; 356/5.01
(58) Field of Classification Search
USPC ............... 356/3.01–3.15, 4.1–4.1, 5.01–5.15, 356/6–22, 28, 28.5
See application file for complete search history.

(56) References Cited

U.S. PATENT DOCUMENTS

| 2001/0025922 A1 | 10/2001 | Lautenschlager et al. |
| 2002/0093639 A1 | 7/2002 | Haga |
| 2004/0051860 A1* | 3/2004 | Honda et al. .................. 356/4.01 |
| 2007/0058155 A1* | 3/2007 | Booker, Jr. .................... 356/5.02 |

FOREIGN PATENT DOCUMENTS

| DE | 30 47 785 A1 | 7/1982 |
| DE | 100 15 511 A1 | 10/2001 |
| DE | 103 28 581 A1 | 3/2004 |
| GB | 2 415 501 A | 12/2005 |
| GB | 2415501 | * 12/2005 |

OTHER PUBLICATIONS

European Search Report, dated Dec. 7, 2011, 5 pages.
German Search Report, dated Feb. 4, 2010, 3 pages.

* cited by examiner

*Primary Examiner* — Luke Ratcliffe
(74) *Attorney, Agent, or Firm* — Crowell & Moring LLP

(57) ABSTRACT

A laser instrument for electro-optical measurement of the distance of a target object to a reference mark is disclosed. The instrument includes a housing, a measuring device which emits a laser beam and determines a distance value from the receiving beam coming from the target object, an outlet opening to couple out the laser beam from the housing, a display device to display the distance value and an operating device to operate the laser instrument and to start a distance measurement. The display and operating devices are arranged on an upper side of the housing. The outlet opening is arranged in the upper side, in the lower side opposite from the upper side or in a side surface of the housing.

10 Claims, 4 Drawing Sheets

LASER INSTRUMENT FOR ELECTRO-OPTICAL DISTANCE MEASUREMENT

This application claims the priority of German Patent Document No. 10 2009 026 611.9, filed May 29, 2009, the disclosure of which is expressly incorporated by reference herein.

BACKGROUND AND SUMMARY OF THE INVENTION

The present invention relates to a laser instrument for electro-optical measurement of the distance of a target object to a reference mark comprised of a housing, a measuring device, which emits a laser beam and determines a distance value from the receiving beam coming from the target object, an outlet opening to couple out the laser beam from the housing, a display device to display the distance value and an operating device to operate the laser instrument and to start a distance measurement, wherein the display and operating devices are arranged on an upper side of the housing.

Laser instruments for optical distance measurement (called laser distance meters in the following) are known from the prior art and are marketed commercially. These laser distance meters emit a modulated laser beam, which is aligned on the surface of a target object, whose distance from the laser distance meter is being determined. The light of the laser beam reflected or scattered by the surface of the target object, called the receiving beam in the following, is detected by the laser distance meter and used to determine the distance. The field of application of these types of laser distance meters as a rule includes distances of several centimeters to several hundred meters. The laser distance meters known from the prior art can be divided into two categories in accordance with the arrangement of the transmitting and receiving devices: biaxial arrangements and coaxial arrangements.

FIG. 1a shows a known laser distance meter 1 having a measuring device 2, which aligns the laser beam 3 on a target object 4 and determines a distance value from the light of the laser beam reflected or scattered by the target object 4, which is designated as the receiving beam 5, and having a display device 6 to display the determined distance value as well as an operating device 7 to operate the laser distance meter 1 and to start a distance measurement. The laser distance meter 1 also has an optical sighting device 8, which is supposed to facilitate distance measurement especially in the case of outside measurements or with poor visibility conditions, when the laser beam 3 is hard to see on the target object 4 with the naked eye or is not visible at all.

The laser distance meter 1 is enclosed in a housing 9. The display and operating devices 6, 7 are embedded in an upper side 10 of the housing 9. In order to guarantee great ease of use when operating the laser distance meter 1 and displaying the distance value, the upper side 10 and the lower side 11 of the housing opposite from upper side 10 are the two largest housing surfaces of the laser distance meter 1. The front and rear sides 12, 13 adjacent to the upper side 10 as well as the side surfaces 14, 15 of the housing 9 are configured to be as small as possible in order to build a handy laser distance meter 1.

The laser beam 3 exits from the housing 9 via an outlet opening 16, which is arranged on the front side 12 of the housing 9, wherein the optical axis of the laser beam 3 is aligned approximately perpendicular with the front side 12. The receiving beam 5 coming from the target object 4 enters the laser distance meter 1 via an inlet opening 17, which is also arranged in the front side 12. In the case of the laser distance meter 1 depicted in FIG. 1a, the transmitting and receiving devices are arranged biaxially, i.e., their optical axes run parallel to one another, and do not overlap. As a result, the inlet opening 17 for the receiving beam 5 and the outlet opening for the laser beam 3 are arranged in the front side 12 separated spatially from each other.

Distance measurement to the target object 4 is carried out with respect to a reference mark located on the laser distance meter. In the case of the known laser distance meter 1, the front side 12, the rear side 13, a limit stop tip 18 or measuring extensions (not shown) are used as reference marks. Switching between the reference marks 12, 13, 18 is carried out via a switching device 19 or automatically, for instance if the limit stop tip 18 is folded out 180°.

FIG. 1b shows a schematic view of the interior of the laser distance meter 1 known from FIG. 1a with the measuring device 2, the optical sighting device 8 as well as the display and operating devices 6, 7. The measuring device 2 includes a transmitting device 20 with a beam source 21 and a first beam-shaping optical system 22, a receiving device 23 with a detector 24 and a second beam-shaping optical system 25 as well as an evaluation device 26. The evaluation device 26 is connected via communication connections 27a, 27b, 28 to the detector 24, the beam source 21 and the display device 6. It determines the distance value to the target object 4 from the time difference between the laser beam 3 emitted by the beam source 21 and the receiving beam 5 detected by the detector 4.

The optical sighting device 8 has a first optical element 29 and a second optical element 30. The user looks into the optical sighting device 8 via a sighting viewer 31, which is arranged in the side surface 14 of the housing 9. In this case, the user looks at the second optical element 30, which is configured to be predominantly transmittive for the laser wavelength and configured to be predominantly reflective for the wavelength range of the ambient light 32 being emitted by the target object 4. The ambient light 32 coming from the target object 4 arrives at the optical sighting device 8 with the image of the target object 4 via an inlet opening 33 in the front side 12 and hits the first optical element 29. From there it is deflected in the direction of the second optical element 30. Because the image of the target object 4 is reflected twice, at the first and second optical element 29, 30, an upright, unreversed image of the target object 4 is produced, which the user perceives in the sighting viewer 31.

Arranged in the optical path of the laser beam 34 that is coupled out of the measuring device 2 is a beam splitter 35, which is preferably inclined at 45° to the optical axis of the laser beam 34. The beam splitter 35 is configured such that the predominant portion of the laser beam (e.g., $\geq 95\%$) passes through the beam splitter 35 as a transmitted laser beam 36, while the remaining portion (e.g., 5%) is deflected as the reflected laser beam 37. The reflected laser beam 37 penetrates the second optical element 30 of the optical sighting device 8 and can be perceived by the user as a lighter, almost punctiform spot of light. The second optical element 30 is configured such that it is transmittive for the laser wavelength $\lambda$ and predominantly reflective for the wavelength range of the ambient light being emitted by the target object 4 except for a narrow range around the laser wavelength $\lambda$. When the user looks into the optical sighting device 8, he sees the image of the target object 4 and the spot of light of the reflected laser beam 37, which is located at the same position in the image of the target object 4 as the laser beam 3 on the surface of the target object 4. By positioning the point of light resulting from the reflected laser beam 37 in the image of the target object 4, the laser beam 3 is positioned precisely on the surface of the target object 4.

In the case of all commercially available laser distance meters, the outlet opening to couple out the laser beam, such as is the case with the laser distance meter 1 depicted in FIGS. 1a and 1b, is arranged on the front side of the housing and the distance measurement is carried out primarily with respect to the front and rear sides as reference marks. In the case of hand-operated laser distance meters, development is tending toward smaller and flatter devices. These smaller and flatter laser distance meters produce front and rear sides that are too narrow, which impede the positioning of the laser beam on the target object because, above all, in the case of an uneven substrate, a sufficiently stable level of the laser distance meter is not guaranteed. In addition, distance measurement is first possible for distances that are greater than the length of the housing.

In contrast, the object of the present invention is making a laser instrument for optical distance measurement available, in which a sufficiently stable level during distance measurement is guaranteed. In addition, distance measurement of small distances is supposed to be possible in cramped conditions.

This object is attained in accordance with the invention with the laser instrument for electro-optical distance measurement cited at the outset in that the outlet opening to couple out the laser beam is arranged in the upper side, in the lower side opposite from the upper side or in one of the side surfaces of the housing.

The arrangement of the outlet opening to couple out the laser beam in the upper side, in the lower side opposite from the upper side or in one of the side surfaces of the housing offers the advantage of a stable device surface at the reference mark. The surface on which the laser beam is coupled out of the housing and the housing surface opposite from this surface as well as measuring extensions serve as reference marks for the distance measurement. Because the display and operating devices are arranged in the upper side of the housing, the upper and lower sides, which are determined by the length and width of the housing, are as a rule the two largest housing surfaces. The side surfaces are defined by the length and depth of the housing.

At least one other outlet opening via which the laser beam can be coupled out of the housing is preferably provided in the housing. In the process, the outlet opening and the at least one other outlet opening are arranged in opposing surfaces of the housing in an especially preferred embodiment. This type of laser distance meter makes it possible to carry out distance measurements from one point to both sides in one spatial direction. This is advantageous if, for example, distances between target objects that are hard to reach are supposed to be determined.

In another preferred embodiment, the outlet opening and the at least one other outlet opening are arranged in adjacent surfaces of the housing. This type of laser distance meter makes it possible to carry out distance measurements from one point in two spatial directions. Calculations of area can be carried out via the evaluation device and the results are displayed to the user on the display device.

Three outlet openings are preferably provided to couple out the laser beam from the housing. In doing so, in an especially preferred embodiment, a first outlet opening is arranged in the upper or lower side, a second outlet opening is arranged in one of the side surfaces and a third outlet opening is arranged in the front or rear side of the housing.

This type of laser distance meter offers the possibility of carrying out measurements starting from one point in all three spatial directions without the laser distance meter having to be readjusted. Calculations of area or volume can be carried out via the evaluation device and the results are displayed to the user on the display device.

A switching device is preferably provided to change the operating mode of the laser instrument from a first operating mode in which the laser beam can be coupled out via the outlet opening to at least one other operating mode in which the laser beam can be coupled out via the at least one other outlet opening. It is particularly preferred that the switching device be configured in such a way that pivoting optics are moved from a first position into at least one other position when actuating the switching device, wherein the first and the at least one other position are configured such that the laser beam can be coupled out of the housing via the outlet opening or via the at least one other outlet opening. By switching between different outlet openings using the switching device, it is possible for the user to adapt the laser instrument to local circumstances.

In a preferred embodiment, a signaling device is provided, which displays the selected outlet opening, wherein the signaling device is arranged in particular in the upper side of the housing.

An optical sighting device having a first optical element and a second optical element is preferably provided.

Additional advantages and advantageous embodiments of the subject of the invention can be found in the description and the drawings. Similarly, the characteristics cited in the foregoing and those listed below according to the invention can respectively be used individually or multiply in any combination. The embodiments that are shown and described should not be understood as an exhaustive enumeration, rather they have an exemplary character in describing the invention.

DETAILED DESCRIPTION OF THE DRAWINGS

Unless otherwise indicated, the same or functionally equivalent elements are identified by the same reference numbers in the figures.

Figure 1A:
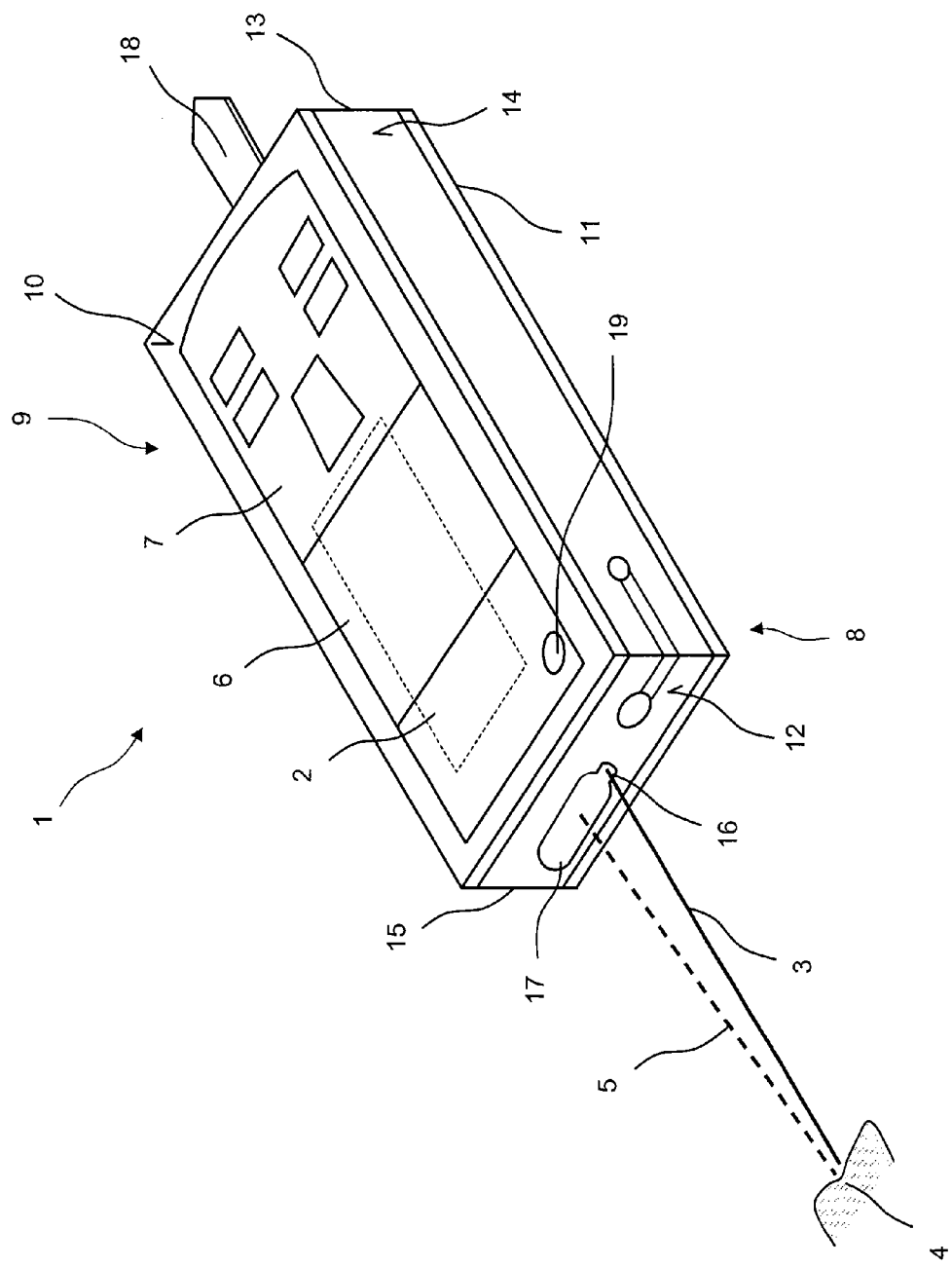
FIGS. 1a and 1b show an exterior view (FIG. 1a) and an interior view (FIG. 1b) of a known laser distance meter.
Figure 1B:
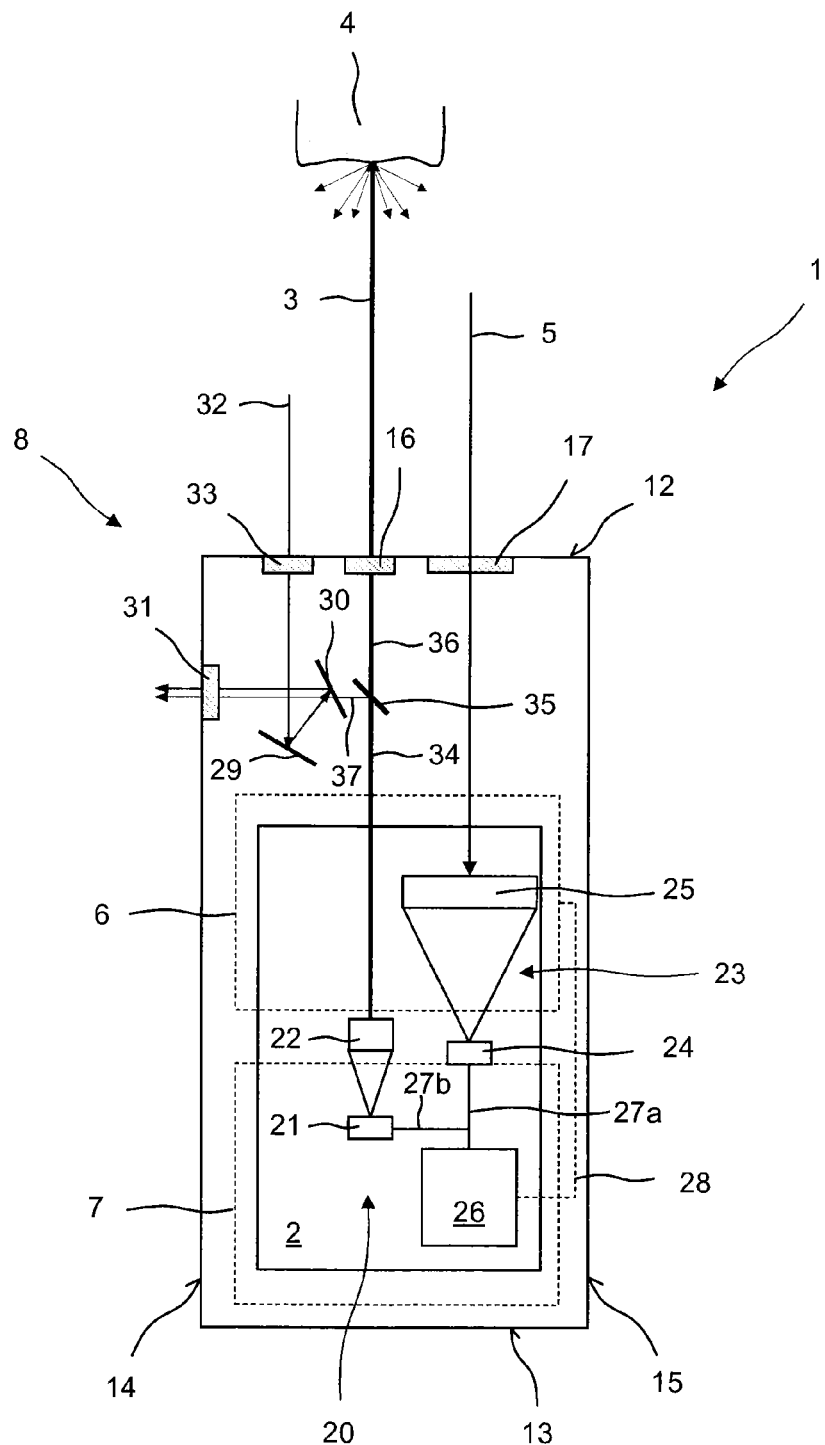
Figure 2:
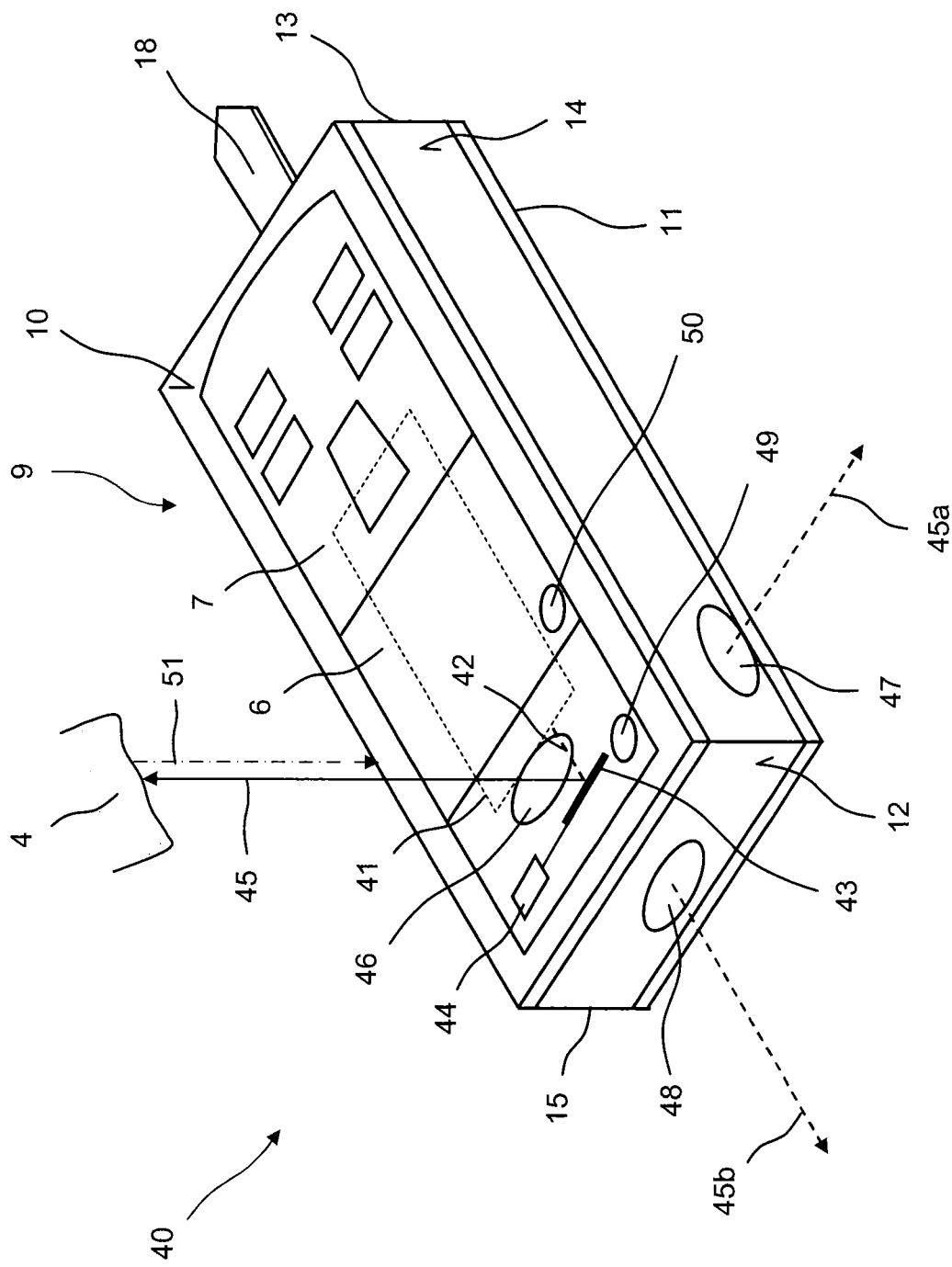
FIG. 2 illustrates a first embodiment of a laser distance meter in accordance with the present invention with three outcoupling openings for the laser beam in the upper side, the front side and a side surface of the housing.

FIG. 2 shows a first embodiment of a laser distance meter 40 in accordance with the invention for optical measurement of a distance of the target object 4 to a reference mark 10-15, 18 located on the laser distance meter 40. The laser distance meter 40 differs from the laser distance meter depicted in FIG. 1a in terms of the outcoupling of the laser beam, otherwise it is constructed analogously. In addition to a measuring device 41 in a coaxial structure, the laser distance meter 40 includes the display and operating devices 6, 7, which are arranged on the upper side 10 of the housing 9.

The laser beam 42 coupled out of the measuring device 41 hits deflection optics 43, which are arranged in the optical path of the laser beam 42. The deflection optics 43 are configured to be pivoting and can be adjusted in several steps or steplessly by an adjusting device 44. In the embodiment in FIG. 2, the deflection optics 43 are arranged in such a way that the laser beam 42 is deflected by 90° at the deflection optics and coupled out of the laser distance meter 40 as a laser beam 45 via an outcoupling opening 46, which is arranged in the upper side of the housing 9.

In addition to the first outlet opening 46, the laser distance meter 40 has a second outlet opening 47 in the side surface 14 and a third outlet opening 48 in the front side 12. The user uses a switching device 49, which is coupled with the adjusting device 44, to set up at which outlet opening 46, 47, 48 the laser beam 45, 45a, 45b will exit the laser distance meter 40. A signaling device 50, which is arranged in the upper side 10, indicates via which outlet opening 46, 47, 48 the laser beam 45, 45a, 45b is exiting the laser distance meter 40.

The receiving beam 51 coming from the target object 4 enters the laser distance meter 40 via the outlet opening 46.

Figure 3:
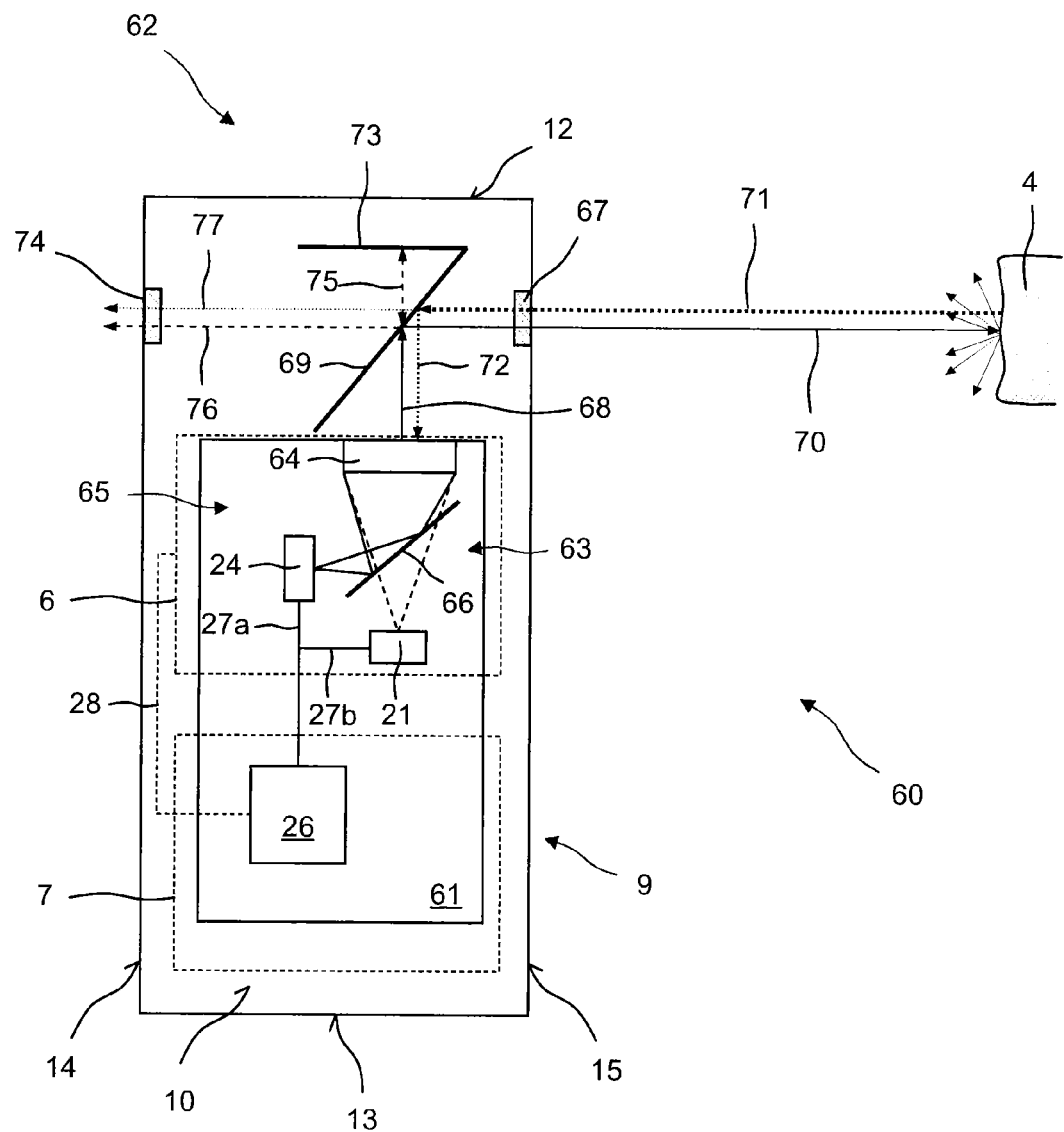
FIG. 3 illustrates a second embodiment of a laser distance meter in accordance with the present invention with an optical sighting device.

FIG. 3 shows a second embodiment of a laser distance meter 60 in accordance with the invention for optical measurement of the distance between the target object 4 and a reference mark located on the laser distance meter 60. The laser distance meter 60 includes a measuring device 61 in a coaxial structure, an optical sighting device 62 as well as the display and operating devices 6, 7, which are arranged on the upper side 10 of the housing 9.

The measuring device 61 includes a transmitting device 63 with the beam source 21 and a beam-shaping optical system 64, a receiving device 65 with the detector 24 and the beam-shaping optical system 64, the evaluation device 26 as well as a beam splitter 66. The transmitting and receiving devices 63, 65 are arranged coaxially, i.e., their optical axes coincide. The beam source 21 is, for example, a semiconductor laser, which generates a laser beam in the visible spectrum, for instance a red laser beam with a wavelength of 635 nm, or another laser with a suitable wavelength and power. The laser beam leaves the beam source 21 at an opening where the laser beam is bent. Because of the bending and divergence, the laser beam expands. In order to restrict the beam diameter of the laser beam to the target object 4, the laser beam is collimated by the beam-shaping optical system 64 or focused on the target object 4. The beam-shaping optical system 64 is a shared optical element of the transmitting and receiving devices 63, 65. It is configured in such a way that the laser beam coupled out of the beam source 21 is collimated or focused on the target object 4 and the receiving beam coming from the target object 4 is focused via the beam splitter 66 on the detector 24. The beam splitter 66 is used to separate the laser beam that is coupled out of the beam source 21 from the receiving beam, which is reflected or scattered by the target object 4 and is supposed to be detected by the detector 24. The beam splitter 66 is designed in such a way that it is configured to be predominantly transmittive for the wavelength and the polarization direction of the laser beam. The detector 24 is, for instance, a photo diode or another receiver adjusted to the wavelength and the power of the beam source 21. The receiving beam reflected or scattered by the target object 4 is focused on the detector 24 with the aid of the beam-shaping optical system 64 and the beam splitter 66. The beam splitter 66 is configured to be essentially reflective for the wavelength of the laser beam and the polarization direction that is orthogonal to the laser beam. The evaluation device 26 is connected via the communication connections 27a, 27b to the detector 24 and the beam source 21, and determines the distance value to the target object 4 from the time difference between the laser beam emitted by the beam source and the receiving beam detected by the detector 24. The evaluation device 26 is connected via the communication connection 28 to the display device 6, which displays the measured distance value.

An outlet opening 67 to couple out the laser beam from the housing 9 of the laser distance meter 60 is arranged in the side surface 15. To deflect the laser beam 68 coupled out of the measuring device 61 in the direction of the outlet opening 67, deflection optics 69 are provided, which are preferably inclined at 45° to the optical axis of the laser beam 68. The deflection optics 69 are configured so that the predominant portion (e.g., 95%) is deflected as the reflected laser beam 70 in the direction of the outlet opening 67. The reflected laser beam 70 exits the laser distance meter 60 via the outlet opening 67 and hits the target object 4, where the laser beam 70 is reflected and/or scattered. The reflected and/or scattered laser light arrives at the laser distance meter 60 as the receiving beam 71 via the outlet opening 67 and hits the deflection optics 69. At the deflection optics 69, the predominant portion (e.g., 95%) of the receiving beam 71 is deflected as the reflected receiving beam 72 in the direction of the beam-shaping optical system 64 of the measuring device 61. The reflected receiving beam 72 is focused by the beam-shaping optical system 64 and projected via the beam splitter 66 to the detector 24.

The optical sighting device 62 is provided in order to support the user in aligning the laser beam 70 on the target object 4 and is comprised of two optical elements, the deflection optics 69 as a first optical element and a second optical element 73. The user looks through a sighting viewer 74, which is arranged in the side surface 14 of the housing 9, into the optical sighting device 62 and views the deflection optics 69. The alignment of the laser beam 70 on the target object 4 is carried out as follows. A small portion of the laser beam 68 passes through the deflection optics 69 as the transmitted laser beam 75 at the deflection optics 69, which are configured to be predominantly reflective for the laser wavelength. The second optical element 73 of the optical sighting device 62, which is configured to be predominantly reflective for the laser wavelength, is arranged in the optical path of the transmitted laser beam 75. The transmitted laser beam 75 is reflected in itself at the second optical element 73 and hits the deflection optics 69. There the predominant portion of the laser beam 75 is deflected as the reflected laser beam 76 in the direction of the sighting viewer 74 and in this way reaches the user's eye very attenuated, which perceives the laser beam 76 as a sharp point of light. In addition, the ambient light coming from the target object 4 also goes through the outlet opening 67 and the deflection optics 69 and is perceived by the user via the sighting viewer 74 together with the point of light of the laser beam 76. In this connection, the laser wavelength portions are removed from the ambient light, since they are reflected by the deflection optics 69. The point of light of the laser beam 76 reflected into the user's eye is perceived by the user at the same position in the target object image as the mostly invisible real spot of light of the laser beam 70 on the surface of the target object 4.

The sighting viewer 74 of the optical sighting device 62 is arranged in the side surface 14 of the housing 9. The ambient light coming from the target object 4 arrives via the outlet opening 67, which is arranged in the side surface 15 opposing the side surface 14. In contrast to known laser distance meters, in which the inlet opening is arranged in the front side 12 of the housing 9 and the sighting viewer of the optical sighting device is arranged in a side surface of the housing, the inlet opening 67 and the sighting viewer 74 are located on opposing housing surfaces. The stabilization system of the human eye/brain complex functions especially well, if adjustment takes place parallel to the direction of propagation, just as with the laser distance meter 60. In the case of known laser distance meters, the adjustment of the laser beam is accomplished by the optical sighting device perpendicular to the direction of propagation of the laser beam "around a corner," wherein the adjustment around a corner causes problems above all for the inexperienced user.

In the case of the laser distance meter 60 depicted in FIG. 3, the measuring device 61 is aligned in such a way that the optical axis of the outcoupled laser beam 68 runs parallel to the side surface 15. The deflection optics 69 are used to adjust the direction of propagation of the laser beam to the outlet opening 67 arranged in the side surface 15. Alternatively, the measuring device 61 may be aligned in the housing 9 in such a way that the optical axis of the outcoupled laser beam is arranged parallel to the normal vector of the outlet opening 67.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A laser instrument for electro-optical measurement of a distance of a target object to a reference mark, comprising:
   a housing;
   a measuring device which emits a laser beam and determines a distance value from a receiving beam coming from the target object;
   an outlet opening in the housing to couple out the laser beam from the housing and to couple in the receiving beam coming from the target object;
   a display device to display the distance value; and
   an operating device to operate the laser instrument and to start a distance measurement;
   wherein the display and operating devices are arranged on an upper side of the housing;
   and wherein the outlet opening is arranged in the upper side, in a lower side opposite from the upper side, or in a side surface of the housing and wherein the side surface extends along a longest length of the housing.

2. The laser instrument according to claim 1, further comprising at least one other outlet opening in the housing via which the laser beam is coupleable out from the housing and the receiving beam is coupleable in to the housing.

3. The laser instrument according to claim 2, wherein the outlet opening and the at least one other outlet opening are arranged in opposing surfaces of the housing.

4. The laser instrument according to claim 2, wherein the outlet opening and the at least one other outlet opening are arranged in adjacent surfaces of the housing.

5. The laser instrument according to claim 2, wherein three outlet openings are provided in the housing to couple out the laser beam from the housing and to couple in the receiving beam coming from the target object.

6. A laser instrument for electro-optical measurement of a distance of a target object to a reference mark, comprising:
   a housing;
   a measuring device which emits a laser beam and determines a distance value from a receiving beam coming from the target object;
   three outlet openings in the housing to couple out the laser beam from the housing;
   a display device to display the distance value; and
   an operating device to operate the laser instrument and to start a distance measurement;
   wherein the display and operating devices are arranged on an upper side of the housing;
   and wherein the three outlet openings are respectively arranged in the upper side or a lower side, in a side surface of the housing, and in a front side or rear side of the housing.

7. The laser instrument according to claim 2, further comprising a switching device to change an operating mode of the laser instrument from a first operating mode in which the laser beam is coupleable out via the outlet opening to at least one other operating mode in which the laser beam is coupleable out via the at least one other outlet opening.

8. The laser instrument according to claim 7, wherein the switching device is configured such that pivoting optics are moved from a first position into at least one other position when actuating the switching device, wherein the first and the at least one other position are configured such that the laser beam is coupleable out of the housing via the outlet opening or via the at least one other outlet opening.

9. The laser instrument according to claim 2, further comprising a signaling device which displays a selected outlet opening, wherein the signaling device is arranged in the upper side of the housing.

10. The laser instrument according to claim 1, further comprising an optical sighting device having a first optical element and a second optical element.

* * * * *